(12) United States Patent
Patchet et al.

(10) Patent No.: US 7,058,644 B2
(45) Date of Patent: Jun. 6, 2006

(54) PARALLEL TREE SEARCHES FOR MATCHING MULTIPLE, HIERARCHICAL DATA STRUCTURES

(75) Inventors: Richard Patchet, Allen, TX (US); Ravi Narayanan, Plano, TX (US); David Hooker, Plano, TX (US); Srinivas Maram, Frisco, TX (US)

(73) Assignee: Click Commerce, Inc., Chicago, IL (US)

( * ) Notice: Subject to any disclaimer, the term of this patent is extended or adjusted under 35 U.S.C. 154(b) by 460 days.

(21) Appl. No.: 10/265,932

(22) Filed: Oct. 7, 2002

(65) Prior Publication Data

US 2004/0068498 A1 Apr. 8, 2004

(51) Int. Cl.
*G06F 17/00* (2006.01)

(52) U.S. Cl. .............................. 707/101; 707/2; 707/3; 707/102; 707/100

(58) Field of Classification Search .................... 707/3, 707/6–7, 10, 100–104.1; 715/501.1, 513
See application file for complete search history.

(56) References Cited

U.S. PATENT DOCUMENTS

| | | | | |
|---|---|---|---|---|
| 5,519,597 A | * | 5/1996 | Tsai ............................ 362/386 |
| 5,873,078 A | | 2/1999 | Angle et al. .................... 707/3 |
| 5,884,320 A | * | 3/1999 | Agrawal et al. ......... 707/104.1 |
| 5,892,801 A | | 4/1999 | Schneider .................... 375/348 |
| 6,278,995 B1 | | 8/2001 | Hawkinson ..................... 707/4 |
| 6,397,210 B1 | | 5/2002 | Stern et al. ..................... 707/3 |
| 6,401,188 B1 | | 6/2002 | Benayoun et al. ........... 711/217 |
| 6,418,446 B1 | | 7/2002 | Lection et al. .............. 707/103 |
| 6,438,539 B1 | | 8/2002 | Korolev et al. ................. 707/3 |
| 6,654,734 B1 | * | 11/2003 | Mani et al. ..................... 707/2 |
| 6,684,204 B1 | * | 1/2004 | Lal ................................ 707/3 |
| 6,742,001 B1 | * | 5/2004 | Ripley ..................... 707/104.1 |
| 6,928,487 B1 | * | 8/2005 | Eggebraaten et al. ....... 709/246 |
| 2002/0073091 A1 | | 6/2002 | Jain et al. .................... 707/100 |
| 2002/0078035 A1 | * | 6/2002 | Frank et al. .................... 707/3 |
| 2002/0112224 A1 | | 8/2002 | Cox ........................... 717/100 |
| 2002/0120776 A1 | * | 8/2002 | Eggebraaten et al. ....... 709/246 |

(Continued)

OTHER PUBLICATIONS

E. Bruce Jackson & Bruce L. Hildreth, "Flight Dynamic Model Exchange Using XML"—Modeling and Simulation Conference—Aug. 5-8, 2002, Montery, California.*

(Continued)

*Primary Examiner*—Jean Corrielus
*Assistant Examiner*—Anh Ly
(74) *Attorney, Agent, or Firm*—Kermit D. Lopez; Luis M. Ortiz; Ortiz & Lopez, PLLC (57) ABSTRACT

Methods and systems in a data-processing system for matching data contained in a hierarchical data tree structure. One or more sets of data contained within a first data tree structure can be associated with one or more sets of data contained within a second data tree structure, such that the data associated with the first data tree structure is generally utilized to process the data associated with the second data tree structure. The first data tree structure can then be compared in parallel to the second data tree structure beginning with a first root thereof to thereby identify data similarities between the first and second data tree structures based on a predefined search criteria. Finally, one or more matching set of data between the first data tree structure and the second data tree structure can be identified, in response to comparing the first data structure to the second data structure.

14 Claims, 4 Drawing Sheets

U.S. PATENT DOCUMENTS

| | | | | |
|---|---|---|---|---|
| 2002/0174147 | A1* | 11/2002 | Wang et al. | 707/513 |
| 2003/0014442 | A1* | 1/2003 | Shigi et al. | 707/513 |
| 2003/0046450 | A1* | 3/2003 | Narayanan et al. | 709/331 |
| 2003/0145278 | A1* | 7/2003 | Nielsen | 715/511 |
| 2003/0177119 | A1* | 9/2003 | Cole | 707/7 |
| 2003/0177442 | A1* | 9/2003 | Lou | 715/513 |
| 2003/0237047 | A1* | 12/2003 | Borson | 715/513 |
| 2004/0172442 | A1* | 9/2004 | Ripley | 709/200 |
| 2004/0254915 | A1* | 12/2004 | Motoyama et al. | 707/3 |
| 2004/0261019 | A1* | 12/2004 | Imamura et al. | 715/513 |
| 2005/0027681 | A1* | 2/2005 | Bernstein et al. | 707/1 |
| 2005/0055345 | A1* | 3/2005 | Ripley | 707/3 |
| 2005/0060332 | A1* | 3/2005 | Bernstein et al. | 707/100 |

OTHER PUBLICATIONS

Frank Jung, "XML Backgrounder," Software AG, Aug. 2000, pp. 1-14.

* cited by examiner

PARALLEL TREE SEARCHES FOR MATCHING MULTIPLE, HIERARCHICAL DATA STRUCTURES

TECHNICAL FIELD

The present invention is related to distributed computer networks, such as, for example, the Internet and intranet networks. The present invention is also related to systems and methods for searching information. The present invention is also related to parallel tree search techniques and hierarchical data structures thereof. The present invention is also related to methods and systems for exchanging data among nodes contained within distributed computer networks.

BACKGROUND OF THE INVENTION

For decades, the software industry has encouraged the development of applications that can define unique data structures for storing and passing information. The format of these structures is known only to the applications creating them. Little or no information is contained within the structures to identify the data. While efficient for the applications, this practice has made the integration of, and communication between, applications a difficult and tedious task. With the rise of the Internet as a business-to-business communication medium, the need to simplify this integration and communication has become critical.

The Internet is a global network of computers and computer networks that are linked with one another and communicate by virtue of the so-called Internet Protocol (IP), which is well known in the networking arts. IP is a packet-switched communications protocol. In such protocols the information to be transmitted is broken up into a series of packets (i.e., sets of data) that are encapsulated in a type of electronic envelope (i.e., the packet), including a portion called a header that includes fields for identifying the source of the transmission, the destination, and other information about the data to be delivered to the destination, which is often referred to as the payload.

A popular application for the Internet is to access the so-called World Wide Web (i.e., or simply the "Web" or "web"), which uses a protocol called HTTP (HyperText Transfer Protocol) by client units for connecting to servers associated with the Web. A client unit (e.g., a microcomputer unit with a communication subsystem connected to the Internet) can invoke the HTTP by simply typing an "http://" prefix with the desired Web address. Once the connection is made to the desired Web site, the user (or client) can access any document stored on that site that is available to that user. The interface used by the client is an application program called a Web browser (i.e., Netscape and Explorer browsers are popular examples). The browser establishes hypertext links to the subject server, enabling the user to view graphical and textual representations of information provided by the server.

The Web generally relies on a language called HTML (HyperText Mark Up Language), which with Web-compliant browsers are capable of rendering text, graphics, images, audio, real-time video, etc. HTML is independent of client operating systems. So HTML renders the same content across a wide variety of software and hardware operating platforms. Software platforms include Windows 3.1, Windows NT, Apple's Copeland and Macintosh, and IBM's AIX and OS/2, HP Unix, etc. Popular compliant Web-Browsers include Microsoft's Internet Explorer and Netscape Navigator. The browser interprets links to files, images, sound clips, etc. through the use of hypertext links. Upon user invocation of a hypertext link to a Web page, the browser initiates a network request to receive the desired Web page.

Internet users are faced with an ever-increasing number of sites, which each contain varied information. This results in difficulty finding the desired information. Among commonly used tools for locating information are the so-called search engines or portals to the Internet. These sites provide various indexes to other sites. Search engines use crawlers or spiders, programs having their own sets of rules, to index pages on the Web. Some of these follow every link on every page they find. Others employ particular types of links.

A common problem with the general Internet search is that, often too many result pages are returned and many of these have low relevance to the search request issued by the end-user. Typically, the search engines used in corporate sites are not as powerful as the Internet search engines and typically provide less information than is desirable.

Borrowing from the remarkable success of HTML (i.e., HyperText Markup Language) to render documents universally to users on a computer display, the industry has developed XML (i.e., extensible Markup Language) to render documents universally to applications (i.e., as well as WXML, for "wireless" devices). XML is a well-known standard for encoding both text and data so that content can be processed with relatively little human intervention and exchanged across diverse software, hardware, operating systems, networks and applications thereof. XML generally offers a widely adopted standard for representing text and data in a format that can be processed without much human or machine intelligence. Information formatted via XML can be exchanged across platforms, languages, and applications, and can be utilized with a wide range of development tools and utilities.

Figure 1:
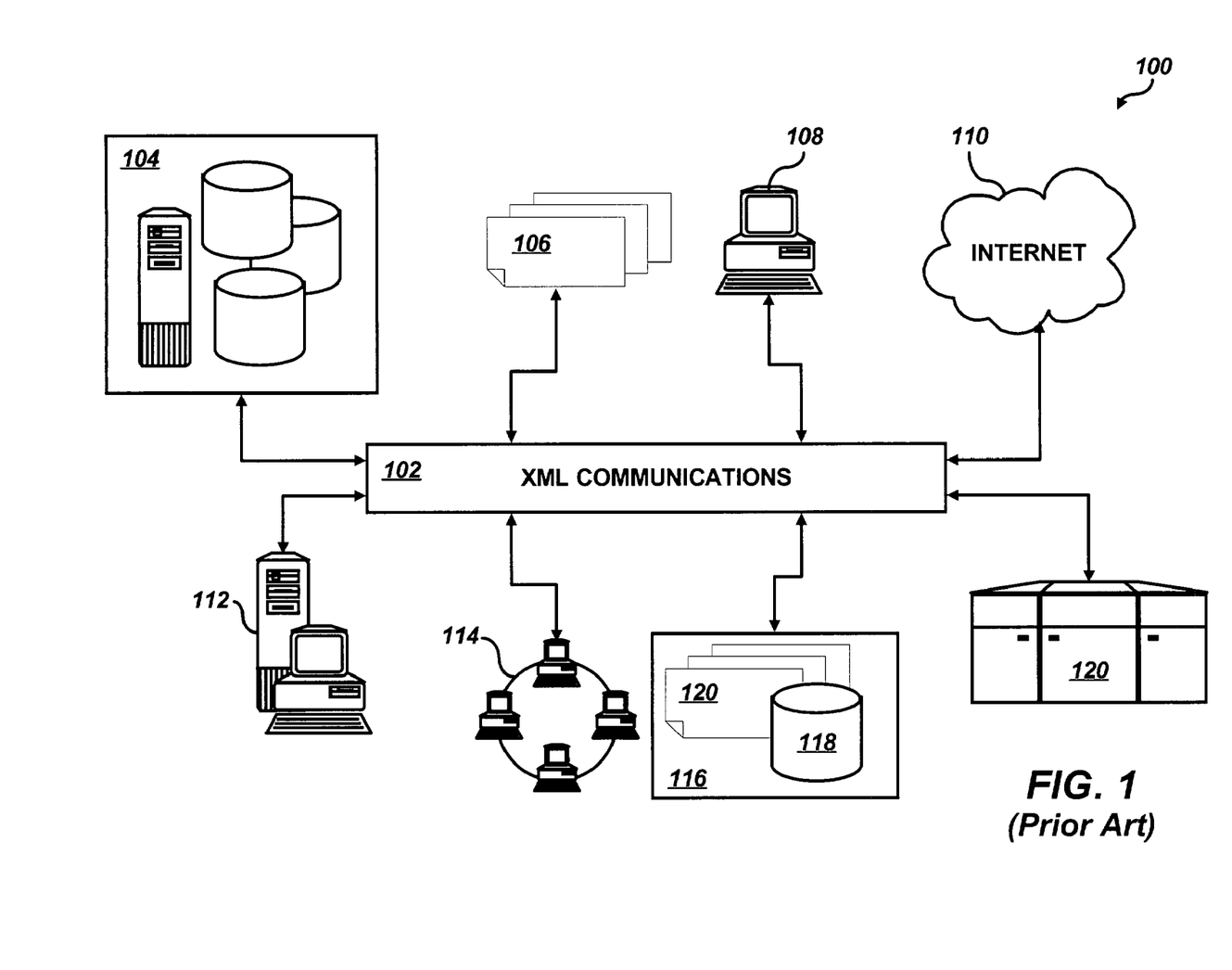
FIG. 1 depicts a block diagram illustrating a prior art XML configuration.

FIG. 1 depicts a block diagram illustrating a prior art XML configuration 100. FIG. 1 specifically illustrates a business-to-business application of XML. As illustrated in system 100 of FIG. 1, XML communications 102 can enable communications with business applications 104, content and/or documents 106, and a web browser displayable on a computer 108 in communication with a computer network, such as the Internet 110 and/or additionally, computer networks such as an Intranet 114 or other internal organizational computer network. XML communications 102 enables communications between a Web server 112 and other hardware or computer devices, such as a mainframe computer 120. Additionally, data can be retrieved from a repository 116 that is formed from a database 118 and associated content or documents 120 thereof.

XML communications 102 generally utilizes the hierarchical markup structure of HTML to store data in a document, such as, for example, one of documents 106, and is extensible in that the markup tags can be defined as required by the creators of the document. While this does not solve the problem of understanding the data contents, at least the description of the data structure is carried with the document.

To lessen the problem of understanding the data contents, many associations, forums, and consortia have formed to define normalized tags and hierarchies, typically along vertical industry lines. Because tags can be nearly anything, without the lessening effect provided by the normalization efforts, the software problem of associating the data with software methods is an infinite-to-infinite search problem. With normalization, associating data with software methods represents a (very) many-to-many search problem, which can serve to reduce the problem from impossible to merely extremely difficult.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide improved methods and systems for searching hierarchical data structures.

It is yet another aspect of the present invention to provide improved methods and systems for matching data contained within data tree structures.

It is still a further aspect of the present invention to provide improved methods and systems for matching data with software methods and business rules utilized to process such data.

It also an aspect of the present invention to provide improved methods and systems for searching XML documents and data structures thereof.

The above and other aspects of the present invention can be achieved as is now summarized. Methods and systems in a data-processing system for matching data contained in a hierarchical data tree structure are disclosed herein. One or more sets of data contained within a first data tree structure (e.g., an index tree) can be associated with one or more sets of data contained within a second data tree structure (e.g., an XML document. The data associated with the first data tree structure can generally be utilized to process the data associated with the second data tree structure. The first data tree structure can then be compared in parallel to the second data tree structure beginning with a first root thereof to thereby identify data similarities between the first and second data tree structures based on a predefined search criteria. Finally, one or more matching set of data between the first data tree structure and the second data tree structure can be identified in response to comparing the first data structure to the second data structure. The present invention thus discloses a method and system, including software methods and modules thereof, for matching a data structure having a widely variable tree structure to another data structure that also contains a widely variable tree structure.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention disclosed herein is directed toward methodology, including systems thereof, which improves upon methods and systems widely utilized in the software arts, specifically, tree search algorithms. The present invention extends the tree search concept by conducting two mutually exclusive tree structures searched in parallel, allowing non-fixed values in tree nodes, for example wildcards or regular expressions, permitting multiple matches, and associating one or more conditional expressions with tree nodes to further refine the matching criterion.

With respect to a particular embodiment of the present invention, data element names can be matched in a document formatted utilizing XML to the software method utilized to process the data contained in the document's data elements. In addition, the document can be matched to the index. The present invention can also be reversible (i.e., commutative), such that either tree structure may function as the starting point. Note that the term "software methods" as utilized herein can refer to processing information associated with one or more objects, which are well known in the object-oriented programming arts. Object-oriented programming generally defines an "object" as a self-contained module of data and its associated processing details or associated processing information (i.e., also known as "software methods").

Figure 2:
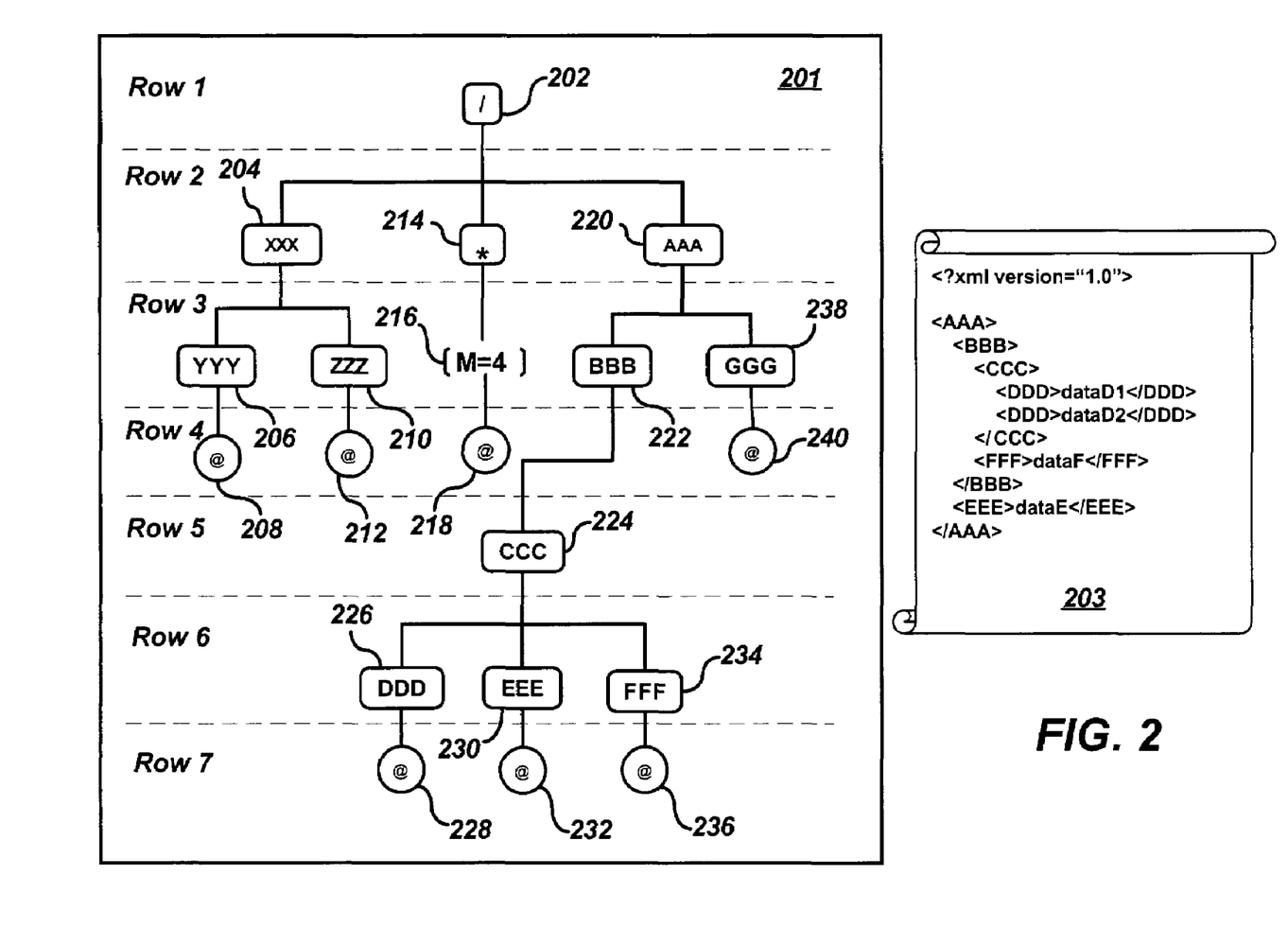
FIG. 2 illustrates an index tree and a document, which can be implemented in accordance with a preferred embodiment of the present invention.

FIG. 2 illustrates a block diagram of an index tree 201 and a document 203, which can be implemented in accordance with a preferred embodiment of the present invention. FIG. 1 generally depicts a sample index tree 201, which is located to the left of an XML document 203. Document 203 contains a root data element, which is the outermost data element in an XML document hierarchy, named "AAA". Beneath "AAA" are two child data elements, named "BBB" and "EEE". It is worth noting that "EEE" contains the string "dataE". Beneath "BBB" are also two child data elements named "CCC" and "FFF". Again, it is important to note that "FFF" includes the string "dataF". Finally, as indicated within document 203, beneath "CCC" are two child data elements both named "DDD" and includes the strings "dataD1" and "dataD2" respectively.

An index tree such as, for example, index tree 201, is generally anchored at the root of any XML document, as represented by the diagonal depicted at block 202 in row 1.

All XML documents have a root that conceptually represents the document as a whole and that does not possess a physical representation within the document itself. The index contains entries for root nodes, nodes that are children of the document root, such as for examples the data elements named "XXX" and "AAA" respectively illustrated at blocks 204 and 220 of row 2. In turn, children of the root nodes can represented in subsequent rows, such as row 3, their children in row 4, and so on up to and including whatever depth is required.

In the middle of row 2, for example, is a node as illustrated at block 214 containing only a wildcard character (i.e., "*"), that is, a special character that represents "any character data element name." This indicates that the present invention described herein does not limit the contents of a node in the index tree to only fixed values for matching to documents. The node could, instead, contain a regular expression commonly known as REGEX, which is a very powerful string-matching construct well known in the software arts. Index tree 201 can thus be divided into a plurality of rows. In the example provided by index tree 201, six rows are indicated. Row 1 is generally associated with blocks 204 (i.e., "XXX"), 214 (i.e., "*"), and 220 (i.e. "AAA"). Row 2 includes blocks 206 (i.e., "YYY"), 210 (i.e., "ZZZ"), 216 (i.e., "M=4"), 222 (i.e., "BBB") and 238 (i.e., "GGG"). Row 3 is generally associated with blocks 208, 212, 218, and 240, which each are labeled with an "@" symbol. Row 4 depicts a block 224, which is labeled "CCC," while row 5 is associated with blocks 226, 230, and 234, which are respectively labeled "DDD," "EEE," and "FFF." Finally, Row 7 is generally associated with blocks 228, 232, and 236, which are also labeled with an "@" symbol.

Software methods may be associated with any node in the index tree. In the example depicted in FIG. 2, software methods can be represented by the "@" symbol and are generally but not necessarily associated only with leaf nodes in the index tree. A document may match only one node (e.g., with an error given if more than one match occurs) or more than one node, depending on a desired implementation. Further discrimination can be accomplished by associating one or more condition expressions, such as, for example "at least one data element 'M' must contain '4'" beneath the wildcard at node 214 that match only if the path through the index tree and the condition expression(s) also match. The condition may or may not be related to the path through index tree 201, depending on the implementation.

A matching routine can thus begin at the root of index tree 201 in order to search the document 203 for matches associated with any of the "children" beneath the current location. In the example illustrated in FIG. 2, the routine may trim the entire branch of index tree 201 headed by the entry "XXX" as no "XXX" data element exists beneath the root in the document. The matching routine can also initially select the wildcard entry, as it matches "AAA" (i.e., as well as any other data element beneath the root in another document). The condition expression, however, which is associated with the wildcard entry requires that a node named "M" containing the number "4" must exist in the document. If the condition is false, this branch is also trimmed. Finally, the document matches the entry "AAA".

The routine then continues similarly through the index tree 201. A "GGG" branch is trimmed as no "GGG" node exists beneath the "AAA" data element. The "GGG" branch is depicted beginning at block 238 and end with block 240, which possesses a software method, represented by the "@" symbol. A "BBB" branch is followed as a "BBB" data element, and is indicated beginning at block 222 of row 2. Block 222 is located below blow 220. Recall that block 220 is located in row 1 and is associated "AAA" in the document. Note that each block of index tree 201 can also be considered a node of the index tree. A "CCC" branch begins, as indicated at block 224, and comprises a "CCC" data element located beneath "BBB" as depicted in document 203. A branch headed by an "HHH" entry (not shown in FIG. 2) can be trimmed because an "HHH" node does not exist beneath the "CCC" data element. Similarly, a branch headed by an "EEE" entry can be trimmed because an "EEE" entry does not exist beneath the "CCC" data element. Note that although the document contains a data element "EEE", it is under the "AAA" data element in the document, not the "CCC" data element, and therefore is not a match in this index tree. Finally, the document matches the "DDD" entry in the index tree where the software method to process the document is found.

It can be appreciated by those skilled in the art that the methodology generally described with respect to FIG. 2 can be implemented as a program product (i.e., computer program product) composed of one or more modules. The term "module" as utilized herein thus generally refers to a software module. In the computer programming arts, a module can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology illustrated in FIG. 2 for example, can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution. A software module 316, which is depicted herein with respect to FIG. 4, can thus implement and embody the methodology described herein.

Examples of signal-bearing media can include: recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines. The present invention can thus be implemented as a program product composed of a plurality of modules, which can be interactively displayed for a user on a display screen of a data-processing system (e.g., a computer). Such interactivity may be provided by a graphical user interface (GUI), which is well known in the art, including Internet browser applications thereof.

Figure 3:
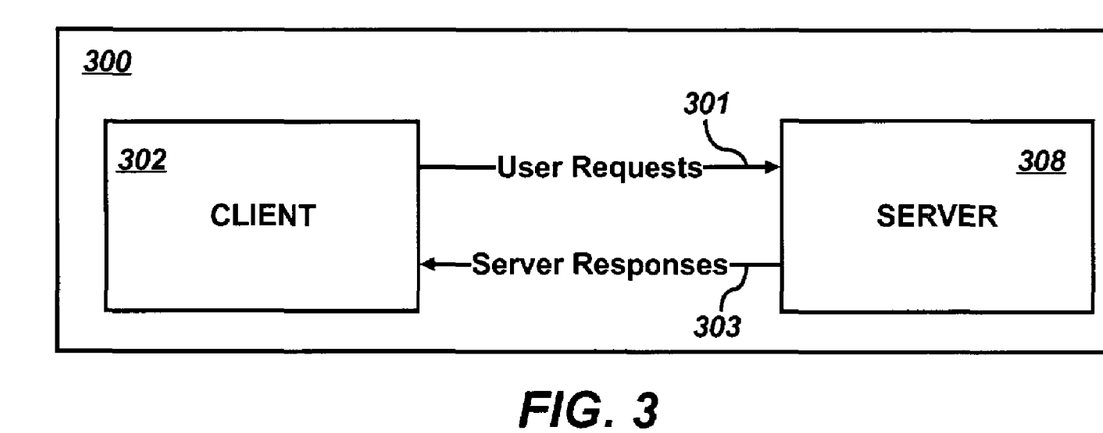
FIG. 3 illustrates a detailed block diagram of a client/server architecture in which a preferred embodiment of the present invention can be implemented.
Figure 4:
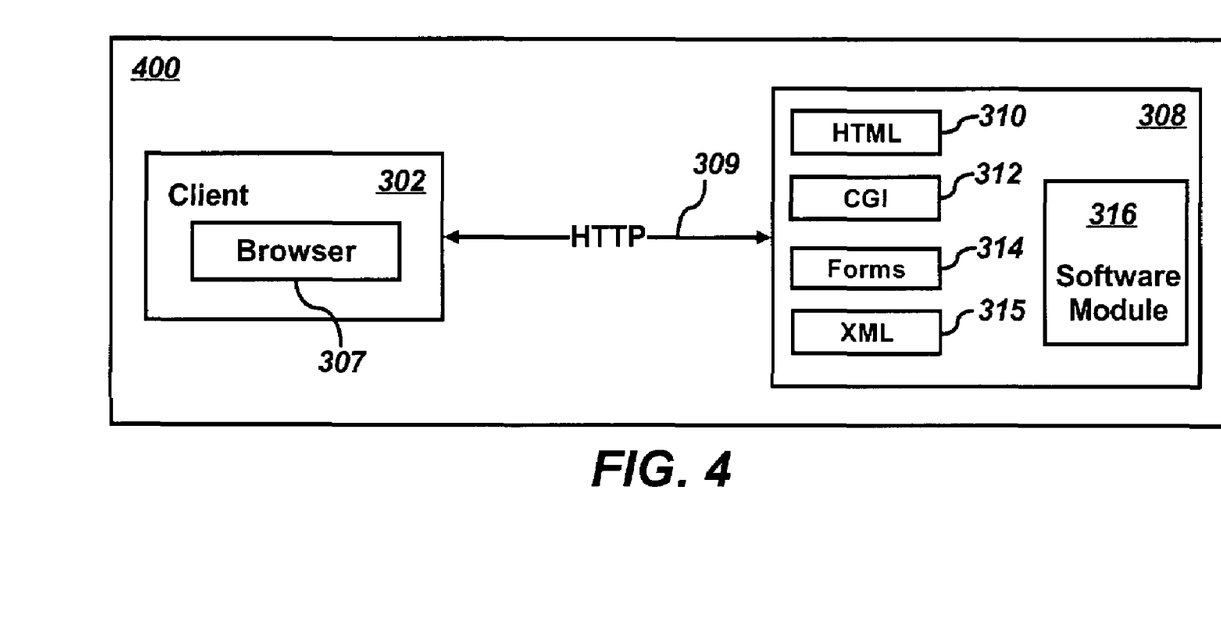
FIG. 4 depicts a detailed block diagram of the client/server architecture depicted in FIG. 3.
Figure 5:
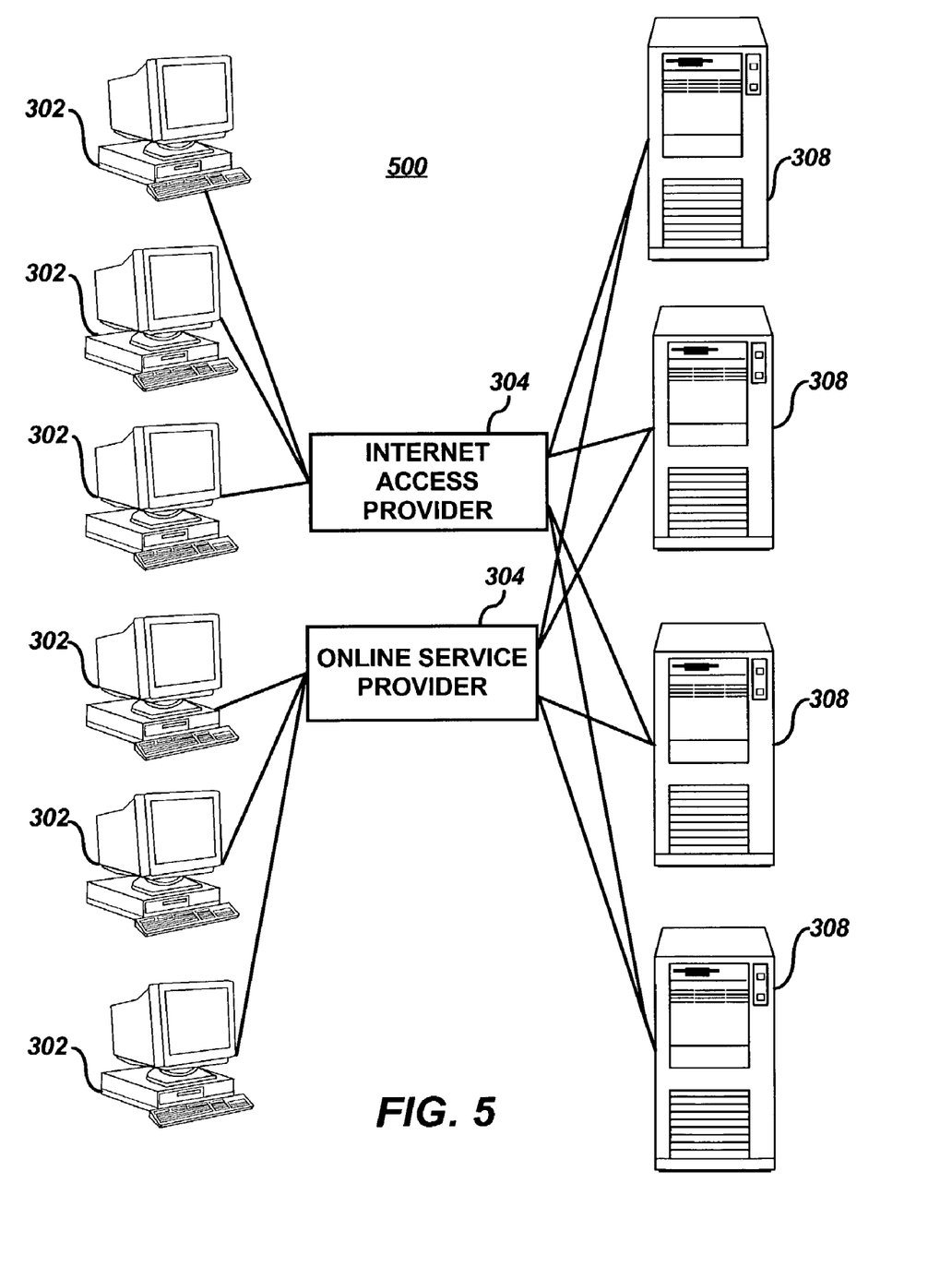
FIG. 5 depicts a block diagram illustrative of a computer network in which a preferred embodiment of the present invention can be implemented.

FIG. 3 illustrates a detailed block diagram 300 of a client/server architecture in which a preferred embodiment of the present invention can be implemented. FIG. 4 depicts a detailed block diagram 400 of the client/server architecture depicted in FIG. 3. Note that in FIGS. 3, 4 and 5 depicted and described herein, like parts are generally indicated by identical reference numerals. The network architecture illustrated in FIGS. 3, 4, and 5 represents merely on possible system in which the present invention can be embodied, and is thus presented herein for illustrative purposes only. The configuration illustrated in FIGS. 3, 4 and 5 is therefore not considered a limiting feature of the present invention. Although the client and server are processes that are operative within two computer systems, these processes can be generated from a high-level programming language (e.g., PERL), which is interpreted and executed in a computer system at runtime (e.g., a workstation).

As indicated in FIGS. 3 and 4, client 302 and server 308 can communicate utilizing the functionality provided by HTTP. Active within client 302 is a first process, browser 307, which establishes connections with server 308, and presents information to the user. Any number of commercially or publicly available browsers can be utilized in various implementations in accordance with the preferred embodiment of the present invention. For example, a browser such as Netscape® can provide the functionality specified under HTTP.

User requests 301 for data can be transmitted by a client application program to a server 308. Server 308 can be, for example, a remote computer system accessible over the Internet or other communication networks. Note that the term "Internet" as utilized herein is well known in the art and refers generally to the worldwide collection of gateways and networks that utilize the TCP/IP suite of protocols to communicate with one another. The term "intranet," on the other hand, refers to a network designed for information processing within a particular company or organization that employs applications associated with the Internet, such as Web pages, Web browsers, and so forth, but which are accessible only to those within the company or organization.

Server 308 generally performs scanning and searching of raw (e.g., unprocessed) information sources (e.g., newswire feeds or news groups) and, based upon these user requests, presents the filtered electronic information as server responses 303 to the client process. The client process may be active in a first computer system, and the server process may be active in a second computer system, communicating with one another over a communications medium, thus providing distributed functionality and allowing multiple clients to take advantage of the information-gathering capabilities of the server.

Server 308 executes the corresponding server software, which presents information to the client in the form of HTTP responses 309. The HTTP responses 309 correspond with the Web pages represented using HTML, or other data generated by server 308. Server 308 provides HTML 310 and/or XML 315 functionalities. Additionally, as indicated earlier herein, a software module 316 which processes the methodology described and claimed herein can be located at server 308. Although not specifically illustrated in FIG. 4, those skilled in the art can appreciate that the software module 316 can also be stored within a memory location of a client or another computer or data-processing system and processed at the client or in association with a server, such as server 308. With certain browsers, a Common Gateway Interface (CGI) 312 can also be provided, which allows the client program to direct server 308 to commence execution of a specified program contained within server 308. This can include a search engine that scans received information in the server for presentation to the user controlling the client.

By utilizing this interface, and HTTP responses 309, server 308 may notify the client of the results of that execution upon completion. Common Gateway Interface (CGI) 312 is one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client can direct the filling out of certain "forms" from the browser. This is provided by the "fill-in-forms" functionality (i.e., forms 314), which can be provided by some browsers, such as the Netscape-brand browser described herein. This functionality allows the user via a client application program to specify terms in which the server causes an application program to function (e.g., terms or keywords contained in the types of stories/articles, which are of interest to the user). This functionality is an integral part of the search engine.

FIG. 5 depicts a block diagram illustrative of a computer network 500 in which a preferred embodiment of the present invention can be implemented. Computer network 500 is representative of the Internet, which can be described as a known computer network based on the client-server model discussed herein. Conceptually, the Internet includes a large network of servers 308 that are accessible by clients 302, typically users of personal computers, through some private Internet access provider 304 (e.g., an internal company Intranet) or an on-line service provider 306 (e.g., such as America Online, Prodigy, Juno, and the like). Each of the clients 302 may run a browser to access servers 308 via the access providers. Each server 308 can operate a so-called "web site" that supports files in the form of documents and web pages. A Universal Resource Locator (URL) having a known syntax for defining a network collection can identify a network path to servers 308. Computer network 500 can thus be considered a web-based computer network. Note that a server, such as server 308, can be configured to function as a domain server (e.g., a Windows domain server). Thus, one or more servers 308 can function as a preauthentication server in accordance with a preferred embodiment of the present invention.

Several advantages can be obtained from practicing the invention described herein. In typical practice, a known, fixed key in a document is utilized to delve into an index, often created using a tree structure that points to the routines capable of handling the document or to additional data associated with the key. The utilization of a key in this context is usable only because the data structure is known in advance and limited in scope and variety. Therefore, the index is of reasonable scale. With XML documents, the tags (i.e., potential keys) are varied in both name and location within the document hierarchy. The XML data structure is enormous in scope and variety. Therefore, the index is equally enormous in scale. It is this scale that renders traditional methods insufficient. The present invention disclosed herein thus describes a software method for matching a data structure with a widely variable, tree structure to another data structure with a widely variable, tree structure.

The invention disclosed herein is generally useful under any circumstances in which two groups of hierarchically arranged data must be matched. The example described herein with respect to FIG. 2 matches data to the software methods used for processing that data. Additional uses of the present invention can include matching data to stored data for retrieval, matching data to software or services to perform on external data or processes, matching data to security attributes or policies, and also matching data to a location of physical objects referenced by the data, as in a warehouse.

Based on the foregoing, it can be appreciated that the present invention discloses methods and systems in a data-processing system for matching data contained in a hierarchical data tree structure are disclosed herein. According to the methodology described herein, one or more sets of data contained within a first data tree structure (e.g., an index tree) can be associated with one or more sets of data contained within a second data tree structure (e.g., an XML document), such that the data associated with the first data tree structure is generally utilized to process the data associated with the second data tree structure. The first data tree structure can then be compared in parallel to the second data tree structure beginning with a first root thereof to thereby identify data similarities between the first and second data tree structures based on a predefined search criteria. Finally, one or more matching set of data between the first data tree structure and the second data tree structure can be identified, in response to comparing the first data structure to the second data structure. The present invention thus discloses a method and system, including software methods and modules thereof for matching a data structure having a widely variable tree structure to another data structure that also contains a widely variable tree structure.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The invention claimed is:

1. A method in a data-processing system for matching data contained in a hierarchical data tree structure, said method comprising the steps of:
    associating at least one set of data contained within a first data tree structure to at least one set of data contained within a second data tree structure, wherein said data associated with said first data tree structure is utilized to process data associated with Mid second data tree structure;
    comparing said first data tree structure in parallel to said second data tree structure beginning with a first root thereof to thereby identify data similarities between said first and second data tree structures based on a predefined search criteria;
    associating at least one conditional expression with at least one tree node of said first data tree structure to further refine said predefined search criteria, wherein said at least one conditional expression is required for a particular operation to occur;
    designating at least one tree node of said first data tree structure and at least one tree node of said second data tree structure with a regular expression, wherein said at least one matching set of data comprises at least one of the following:
    data matched to software methods;
    data matched to stored data for retrieval thereof;
    data matched to security attributes associated with a computer network; and
    data matched to a location of a physical object referenced by said data; and
    identifying at least one matching set of data between said first data tree structure and said second data tree structure, in response to comparing said first data structure in parallel to said second data structure beginning with said first root thereof and based on said predefined search criteria thereby matching multiple and hierarchical data tree structures.

2. The method of claim 1 wherein said first data tree structure comprises an index tree and said second tree comprises an XML document associated with said index tree.

3. The method of claim 1 wherein said at least one matching set of data comprises a plurality of matching sets of data.

4. The method of claim 1 wherein said at least one matching set of data comprises data matched to stored data for retrieval thereof.

5. The method of claim 1 wherein said at least one matching set of data comprises data matched to security attributes associated with a computer network.

6. The method of claim 1 wherein said at least one matching set of data comprises data matched to a location of a physical objected referenced by said data.

7. The method of claim 1 wherein said first data tree structures and said second data tree structure each comprise at least one node containing a wildcard character and wherein said first and second data tree structures further comprise a plurality of rows.

8. A method in a data processing system for matching data contained in a hierarchical data tree structure, said method comprising the steps of:
    associating at least one set of data contained within a tree index to at least one set of data contained within an XML document, wherein tree index is utilized to process said XML document;
    comparing said tree index in parallel to XML document beginning with a first root thereof to thereby identify data similarities between said tree index and said XML document based on a predefined search criteria;
    identifying at least one matching set of data between said tree index and said XML document, in response to comparing said tree index in parallel to said XML document beginning with said first root thereof and based on said predefined search criteria;
    associating at least one conditional expression with at least one tree node of said tree index to further refine said predefined search criteria, wherein said at least one conditional expression is required for a particular operation to occur; and
    wherein said at least one matching set of data comprises at least one of the following:
    data matched to stored data for retrieval thereof;
    data matched to software methods;
    data matched to security attributes associated with a computer network; and
    data matched to a location of a physical object referenced by said data, thereby matching multiple and hierarchical data tree structures.

9. A system for matching data contained in a hierarchical data tree structure, said system comprising:
- at least one set of data contained within a first data tree structure associated with at least one set of data contained within a second data tree structure, wherein said data associated with said first data tree structure is utilized to process data associated with said second data tree structure;
- comparing module for comparing said first data tree structure in parallel to said second data tree structure beginning with a first root thereof to thereby identify data similarities between said first and second data tree structures based on a predefined search criteria, wherein at least one conditional expression is associated with at least one tree node of said first data tree structure to further refine said predefined search criteria and wherein at least one tree node of said first data tree structure and at least one tree node of said second data tree structure is designated with a regular expression, wherein said at least one conditional expression is required for a particular operation to occurs;
- identification module for identifying at least one matching set of data between said first data tree structure and said second data tree structure, in response to comparing said first data structure in parallel to said second data structure beginning with said first root thereof and based on said predefined search criteria, thereby matching multiple and hierarchical data tree structures; and wherein said at least one matching set of data comprises at least one of the following:
- a plurality of matching sets of data;
- data matched to stored data for retrieval thereof;
- data matched to security attributes associated with a computer network; and
- data matched to a location of a physical object referenced by said data.

10. The system of claim 9 wherein said first data tree structure comprises an index tree and said second tree comprises an XML document associated with said index tree.

11. The system of claim 9 wherein said first data tree structure comprises a software method utilized to process said second data tree structure.

12. The system of claim 9 wherein said matching set of data comprises data matched to stored data for retrieval thereof.

13. The system of claim 9 wherein said matching set of data comprises data matched to security attributes associated with a computer network.

14. The system of claim 9 wherein said first data tree structures and said second data tree structure each comprise at least one node containing a wildcard character and wherein said first and second data tree structures further comprise a plurality of rows.

* * * * *